(12) United States Patent
Jones

(10) Patent No.: US 12,281,744 B2
(45) Date of Patent: Apr. 22, 2025

(54) PIVOTABLE BRACKET WITH INTERNAL CABLE

(71) Applicant: TOP FORM DESIGN, LLC, Yakima, WA (US)

(72) Inventor: Ronald Casey Jones, Yakima, WA (US)

(73) Assignee: TOP FORM DESIGN, LLC, Yakima, WA (US)

( * ) Notice: Subject to any disclaimer, the term of this patent is extended or adjusted under 35 U.S.C. 154(b) by 0 days.

(21) Appl. No.: 18/243,606

(22) Filed: Sep. 7, 2023

(65) Prior Publication Data
US 2025/0084956 A1    Mar. 13, 2025

(51) Int. Cl.
F16M 11/08    (2006.01)
F16M 11/06    (2006.01)
F16M 13/02    (2006.01)

(52) U.S. Cl.
CPC .......... F16M 11/08 (2013.01); F16M 13/022 (2013.01)

(58) Field of Classification Search
CPC .............................. F16M 11/08; F16M 13/022
USPC ............................................ 248/125.7, 441.1
See application file for complete search history.

(56) References Cited

U.S. PATENT DOCUMENTS

| | | | | |
|---|---|---|---|---|
| 4,605,995 A * | 8/1986 | Pike | ........................ | F21S 8/033 362/427 |
| 4,726,552 A * | 2/1988 | Warshawsky | ........... | F21S 6/002 362/427 |
| 4,821,159 A * | 4/1989 | Pike | .................... | F16M 11/2014 362/427 |
| 6,609,691 B2 * | 8/2003 | Oddsen, Jr. | ........ | F16M 11/2092 248/278.1 |
| 6,619,606 B2 * | 9/2003 | Oddsen, Jr | ............. | F16M 11/24 248/282.1 |
| 6,978,974 B1 * | 12/2005 | Marasco | ............... | A63B 71/023 473/429 |
| 7,335,147 B2 * | 2/2008 | Jones | .................. | A63B 71/0622 482/148 |
| 10,948,946 B2 * | 3/2021 | Borloz | ............... | F16M 11/2064 |
| 11,287,083 B2 * | 3/2022 | Lim | ........................ | F16M 11/08 |
| 11,603,962 B2 * | 3/2023 | Miura | ................ | F16M 11/2014 |
| 11,662,055 B2 * | 5/2023 | Vlaar | ..................... | F16M 11/24 248/125.7 |
| 11,678,006 B2 * | 6/2023 | Hinckley | ............... | F16M 11/24 375/240.28 |
| 12,036,911 B2 * | 7/2024 | Pang | ....................... | B62B 3/007 |

(Continued)

Primary Examiner — Nkeisha Smith
(74) Attorney, Agent, or Firm — Svendsen Legal, LLC

(57) ABSTRACT

A pivotable bracket with an internal cable, for use with freestanding personal exercise apparatus. The pivotable bracket connects a top bar of the exercise apparatus, such as a treadmill, to a monitor screen normally connected directly to the top bar, serving to extend the distance between the top bar and the monitor, and to provide a rotatable connection there between. The pivotable bracket comprises of a pivot body and pivot clamp attachable to a bar monitor bracket of the exercise apparatus, and a pivot head including a head post received into the pivot clamp, and the head post of the pivot head able to swivel within the pivot clamp. A monitor can then attach to the pivot head, and an internal connective cable threads through the pivotable bracket and connects to the monitor, which can rotate on the pivotable bracket with the internal cable still connected to the exercise apparatus.

7 Claims, 14 Drawing Sheets

(56) References Cited

U.S. PATENT DOCUMENTS

| | | | | |
|---|---|---|---|---|
| 12,045,084 B2* | 7/2024 | Kwon | .................. | F16M 13/022 |
| 2006/0247109 A1* | 11/2006 | Powell | .................. | A63B 22/02 |
| | | | | 482/904 |
| 2020/0378415 A1* | 12/2020 | Dammermann | ..... | F16M 11/041 |
| 2022/0364676 A1* | 11/2022 | Lau | .................... | F16M 11/2092 |
| 2023/0109955 A1* | 4/2023 | Gu | .......................... | F16B 2/10 |
| | | | | 455/575.1 |

* cited by examiner

US 12,281,744 B2

PIVOTABLE BRACKET WITH INTERNAL CABLE

TECHNICAL FIELD

The present disclosure relates to a pivotable bracket with an internal cable, for use with freestanding personal exercise apparatus. Specifically, the pivotable bracket interconnects a top bar of the exercise apparatus, such as a treadmill, to a monitor screen that is normally connected directly to the top bar, serving to extend the distance between the top bar and the monitor, and provide a rotatable connection there between.

BACKGROUND

The personal treadmill is a modern staple of indoor exercise equipment. Inclement weather, and concerns for personal safety and convenience have brought many to purchase and use the stationary personal treadmill as an exercise equipment priority. To make exercise apparatus more convenient and engaging, monitor screens have been mounted to the forward portions of the apparatus, such as treadmills, providing the user with a long list of enhancements and features, including the display of interactive training aids, entertainment media, progress indicators, and monitoring. A need exists for better viewing of the monitor or screen in exercise equipment with the monitor mounted forward, to the front of the typically user. The following disclosure of the present invention will be understood by reference to the following detailed description, taken in conjunction with the accompanying drawings

BRIEF DESCRIPTION OF DRAWINGS

Exemplary embodiments of the technology will become more fully apparent from the following description and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

Figure 1:
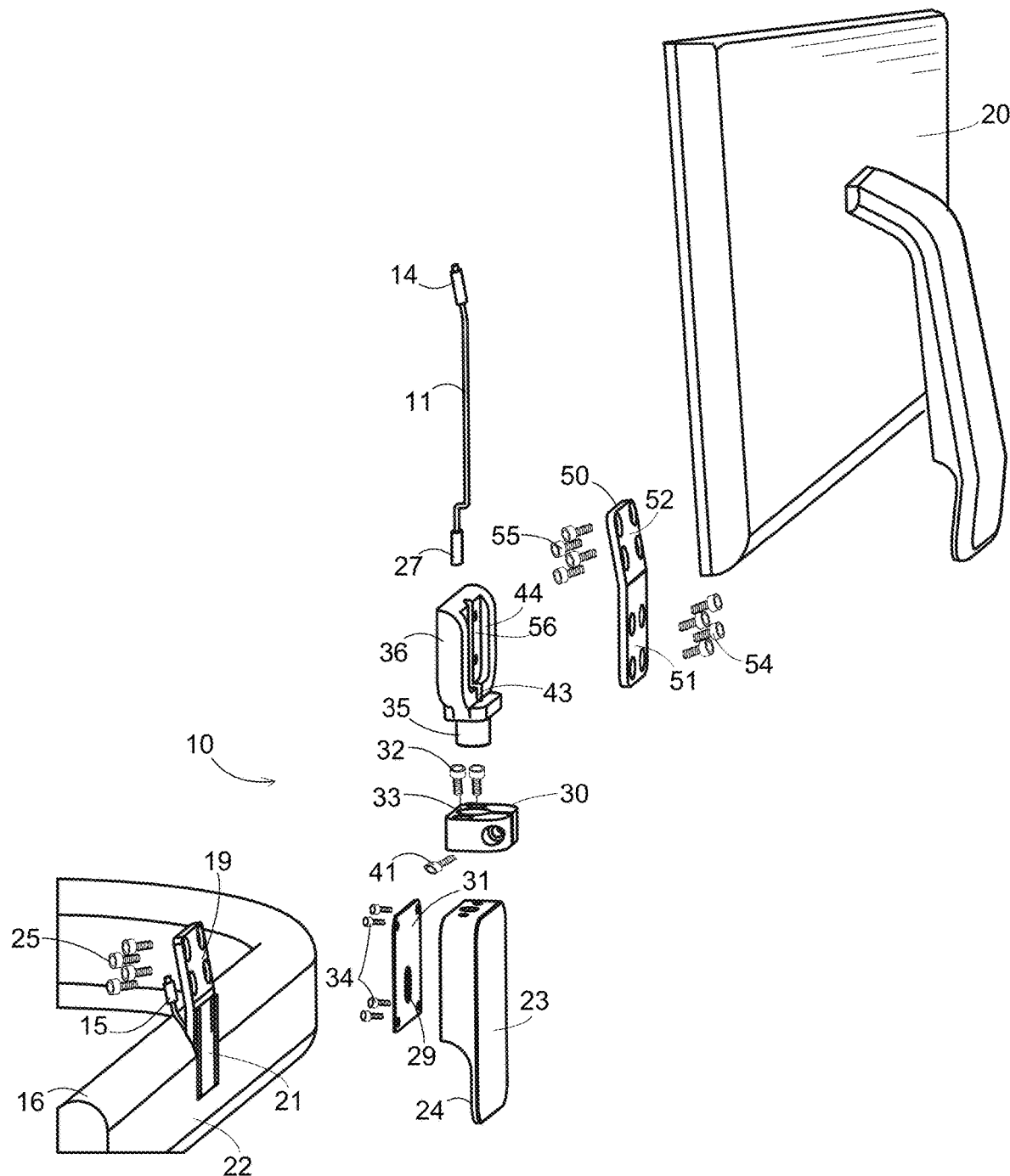
FIG. 1 is an exploded isometric view of a pivotable bracket with internal cable, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations. Details that are not necessary for an understanding of the present invention by one skilled in the technology of the invention, or render other details difficult to perceive, may have been omitted.

DETAILED DESCRIPTION OF SPECIFIC EMBODIMENTS

The present invention is a device that is referred to herein as a pivotable bracket with internal cable 10. This reference may be shortened herein to simply a "Pivotable Bracket". Exemplary embodiments of the Pivotable Bracket will be best understood by reference to the drawings included herewith, wherein like parts are designated by like numerals throughout. It will be readily understood that the components of the device, as generally described and illustrated in the figures herein, could be arranged and designed in a wide variety of different configurations. Thus, the following more detailed description of the embodiments of the device as an apparatus, mechanism or system, and not intended to limit the scope of the invention, as claimed, but is merely representative of exemplary embodiments.

Referring to FIGS. 1 through 15, the Pivotable Bracket 10 of the present invention is configured to contain internally or hold within, an internal connective cable 11. The internal connective cable is broadly defined herein as any line, wire or connector having the purpose of carrying an electrical current, charge, or data signal. Alternatively, the internal connective cable may be a fiber optic data line or data cable. Most preferably, the internal connective cable includes a lower internal connection end 13 and an upper internal connection end 14, as shown in FIG. 1.

Figure 5:
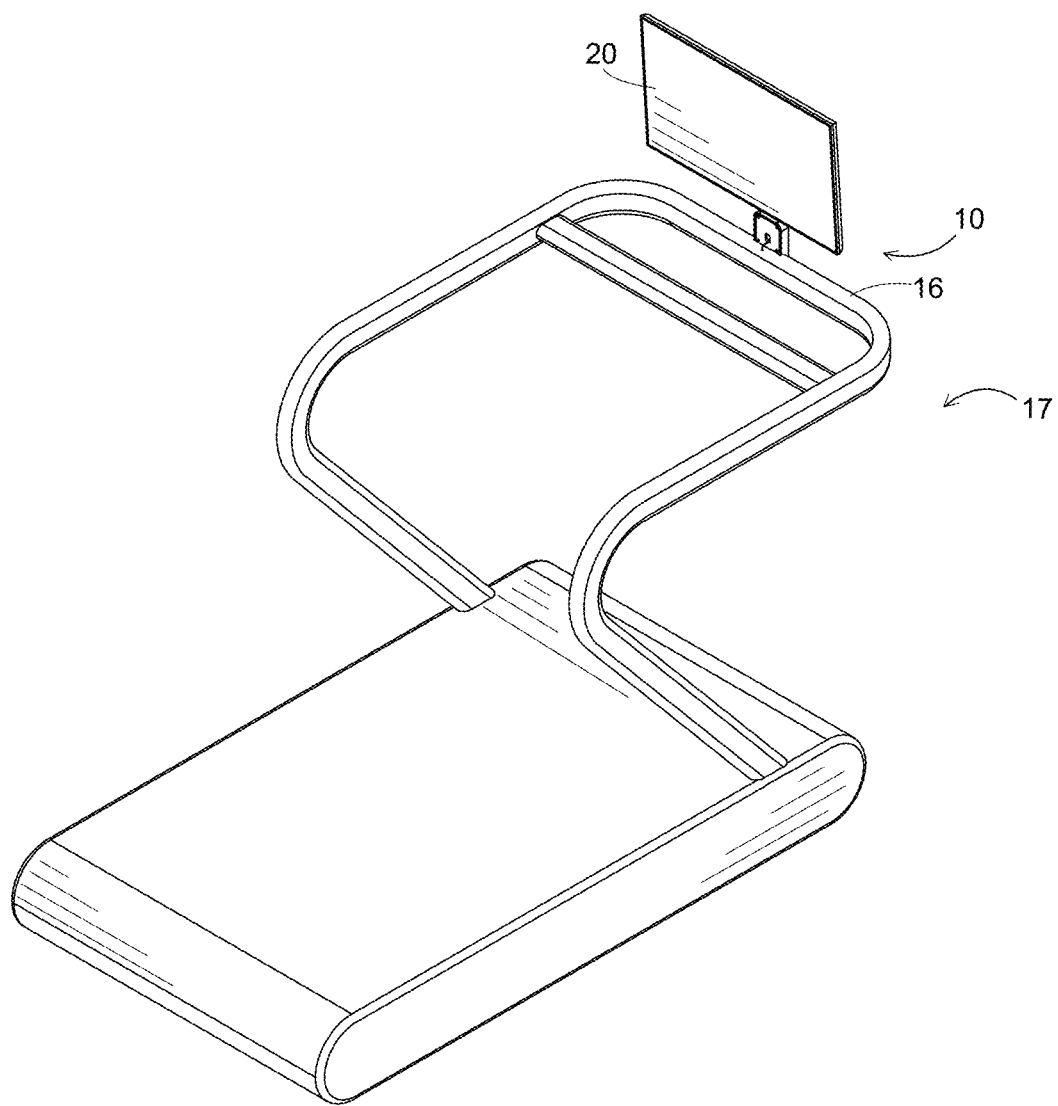
FIG. 5 is an isometric of the pivotable bracket with internal cable as mounted on a treadmill apparatus, according to an embodiment of the invention.
Figure 6:
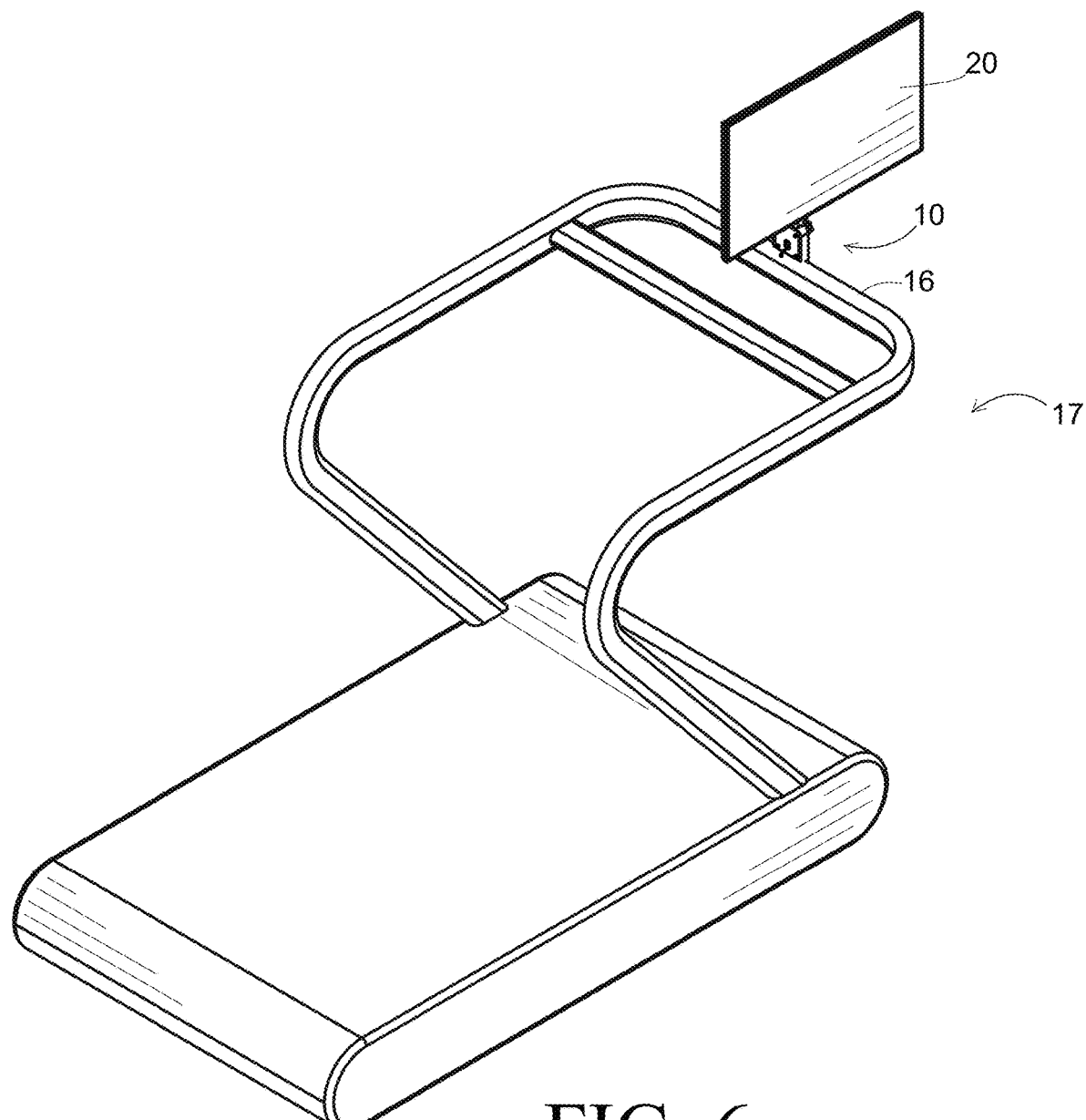
FIG. 6 is an isometric of the pivotable bracket with an internal cable as mounted on a treadmill apparatus, according to an embodiment of the invention.
Figure 7:
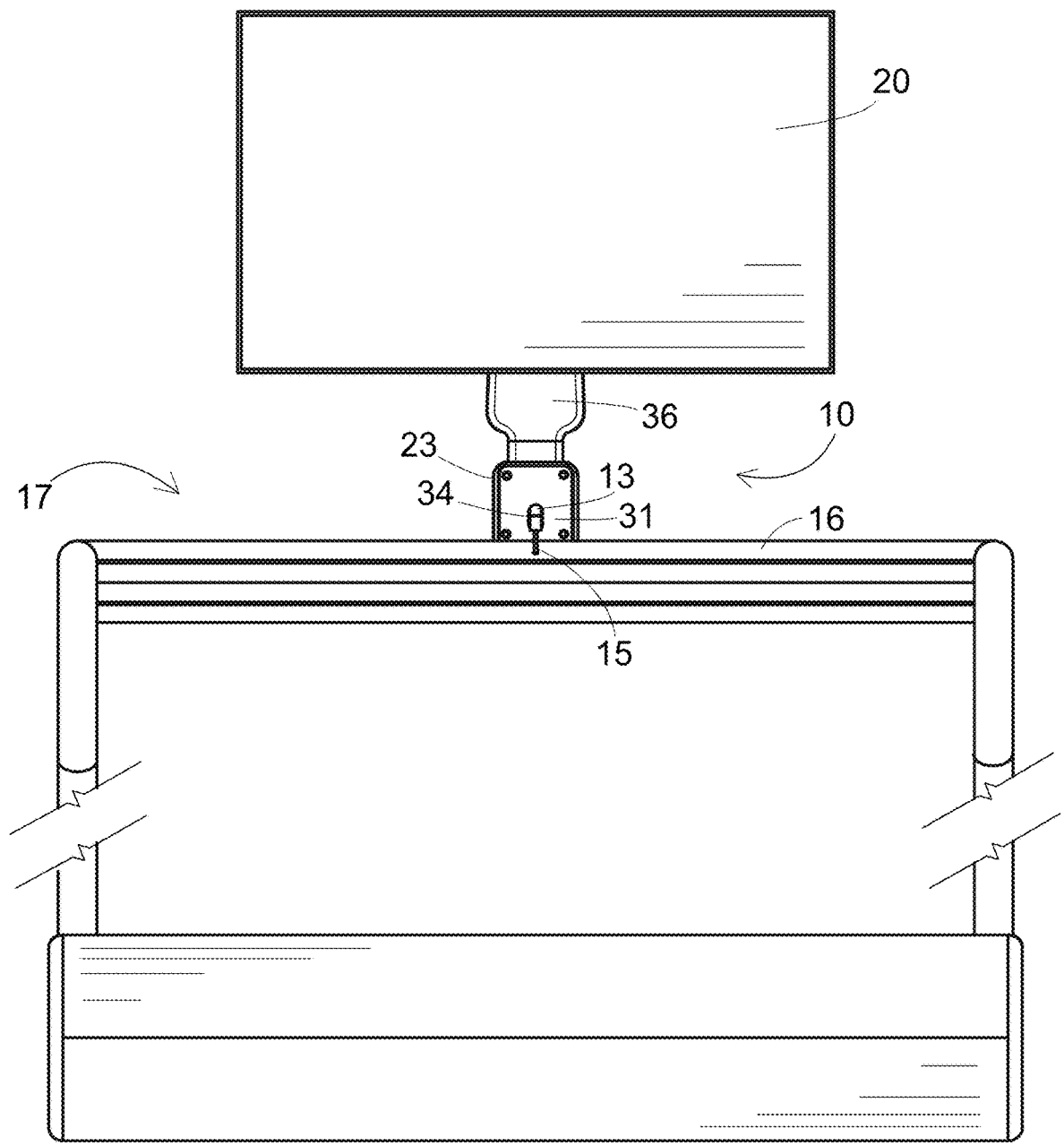
FIG. 7 is a front view of the pivotable bracket with internal cable as mounted on a treadmill apparatus, with a portion of the treadmill apparatus removed, according to an embodiment of the invention.
Figure 8:
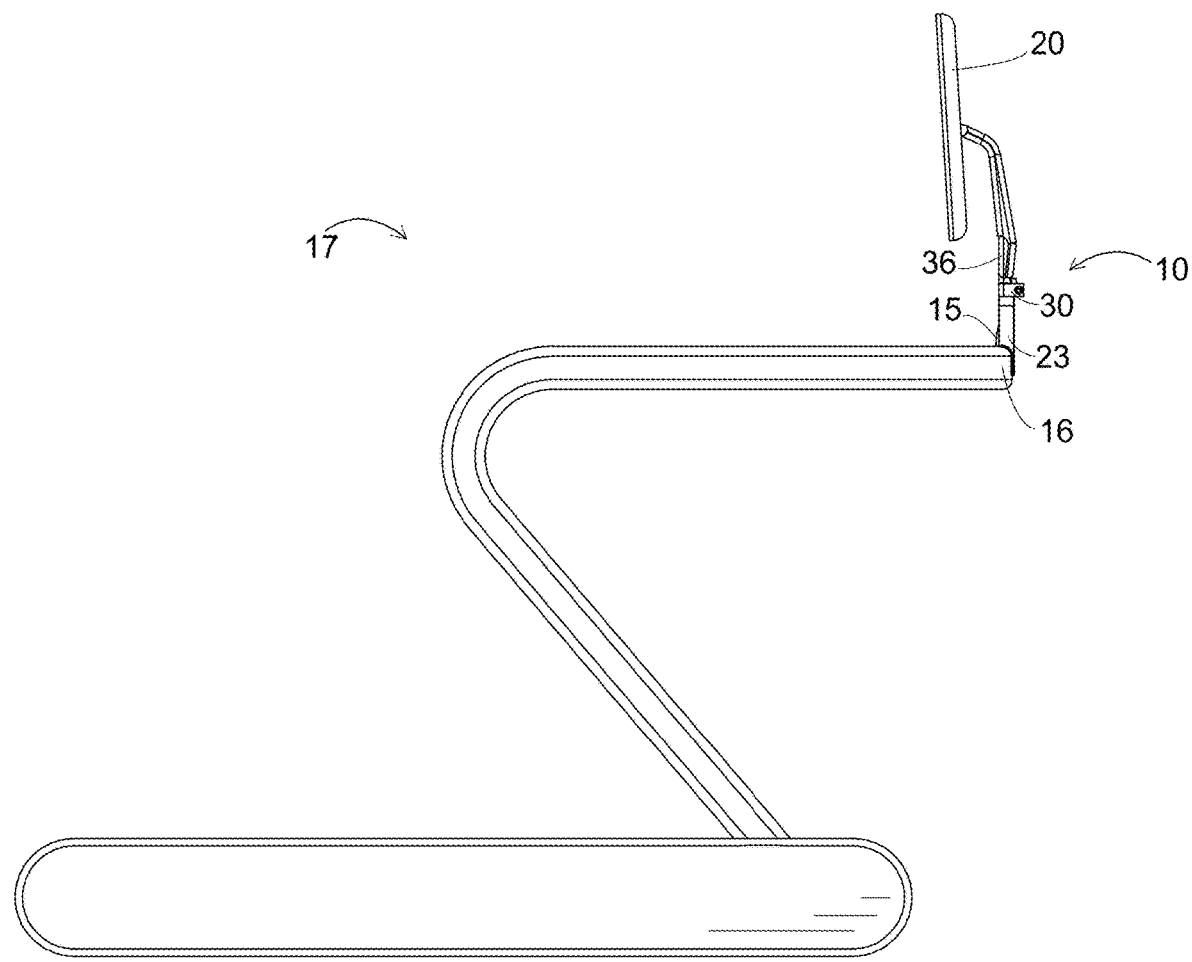
FIG. 8 is a side view of a pivotable bracket with internal cable as mounted on a treadmill apparatus, according to an embodiment of the invention.
Figure 9:
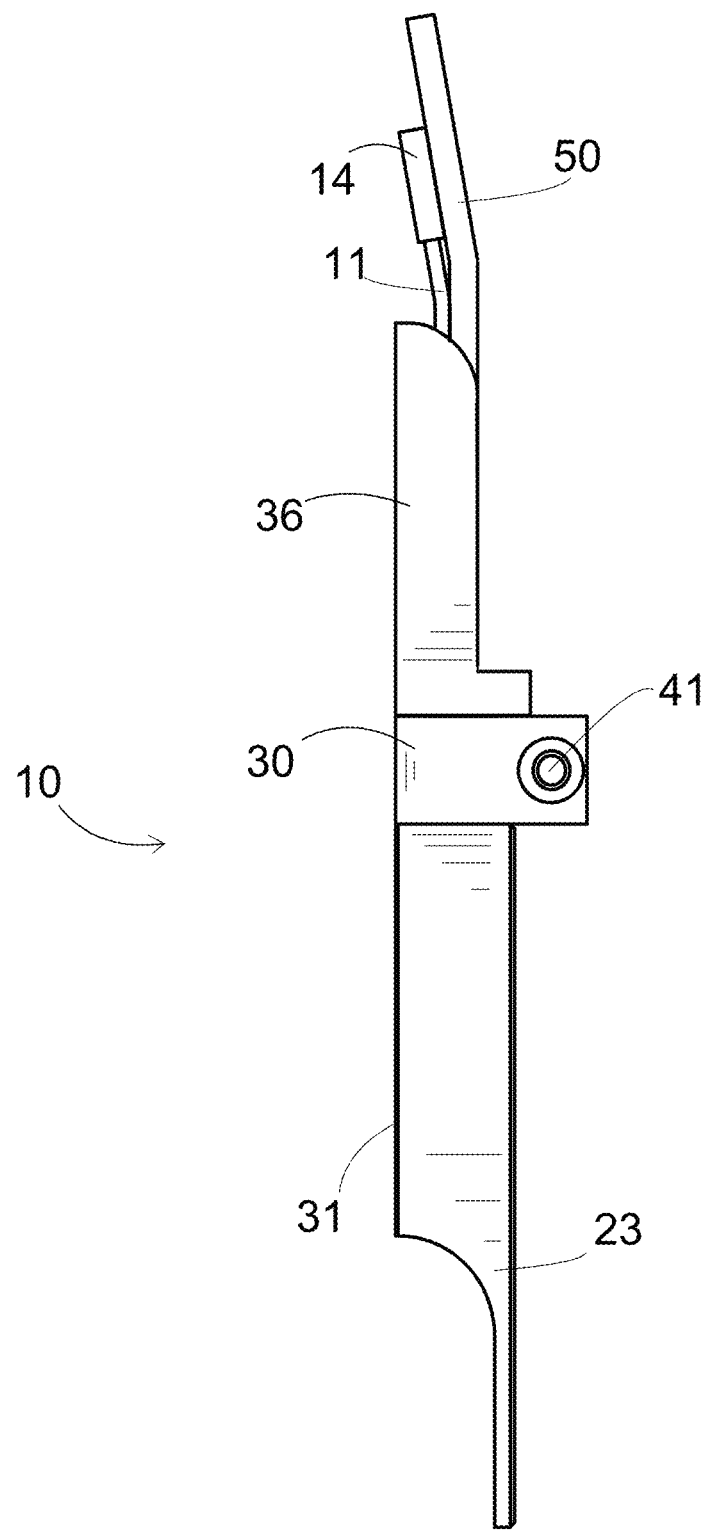
FIG. 9 is a first side view of a pivotable bracket with internal cable, according to an embodiment of the invention.
Figure 10:
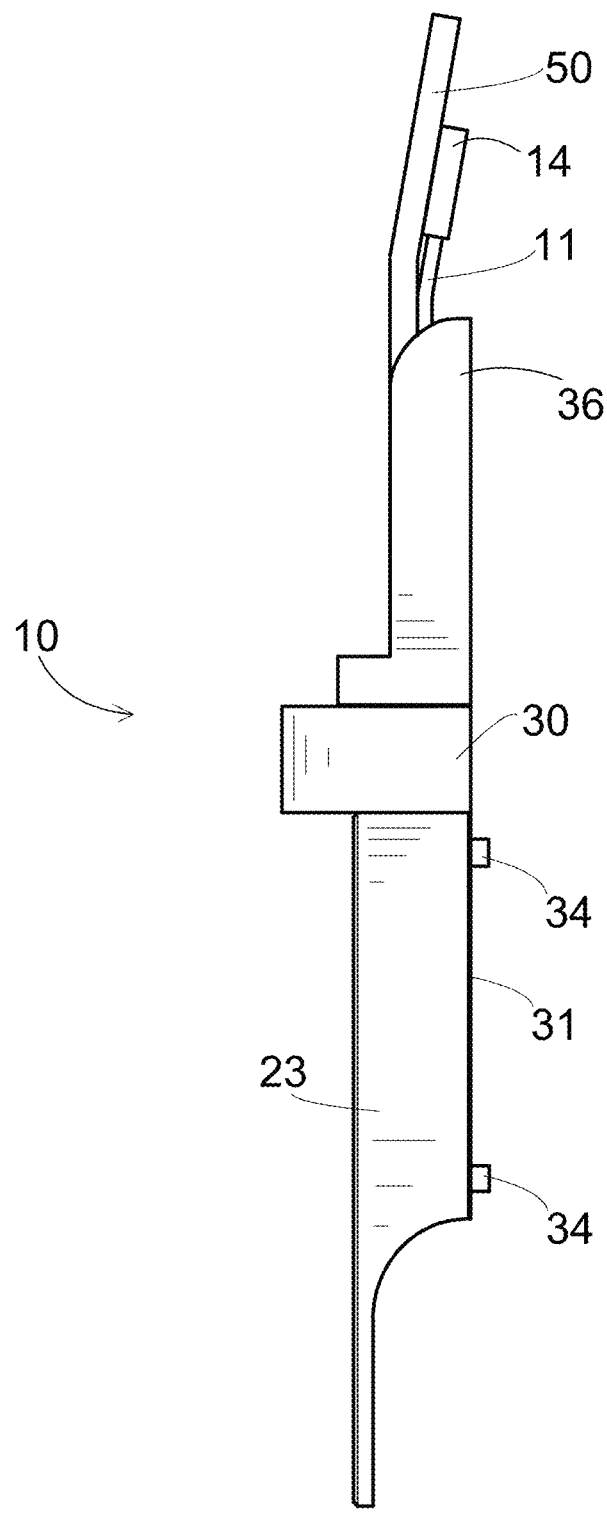
FIG. 10 is a second side view of a pivotable bracket with internal cable, according to an embodiment of the invention.
Figure 11:
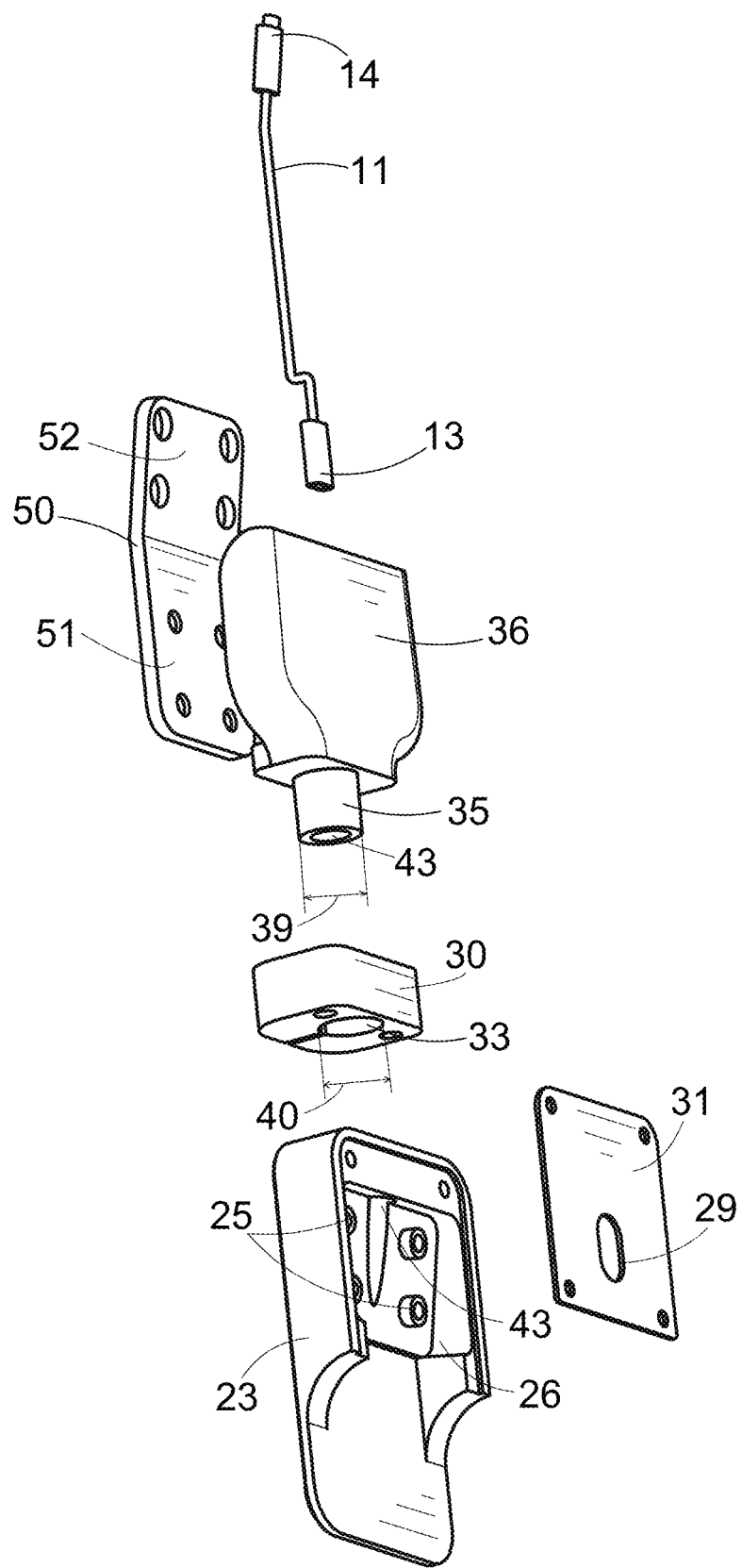
FIG. 11 is an exploded isometric view of a pivotable bracket with internal cable, according to an embodiment of the invention.
Figure 12:
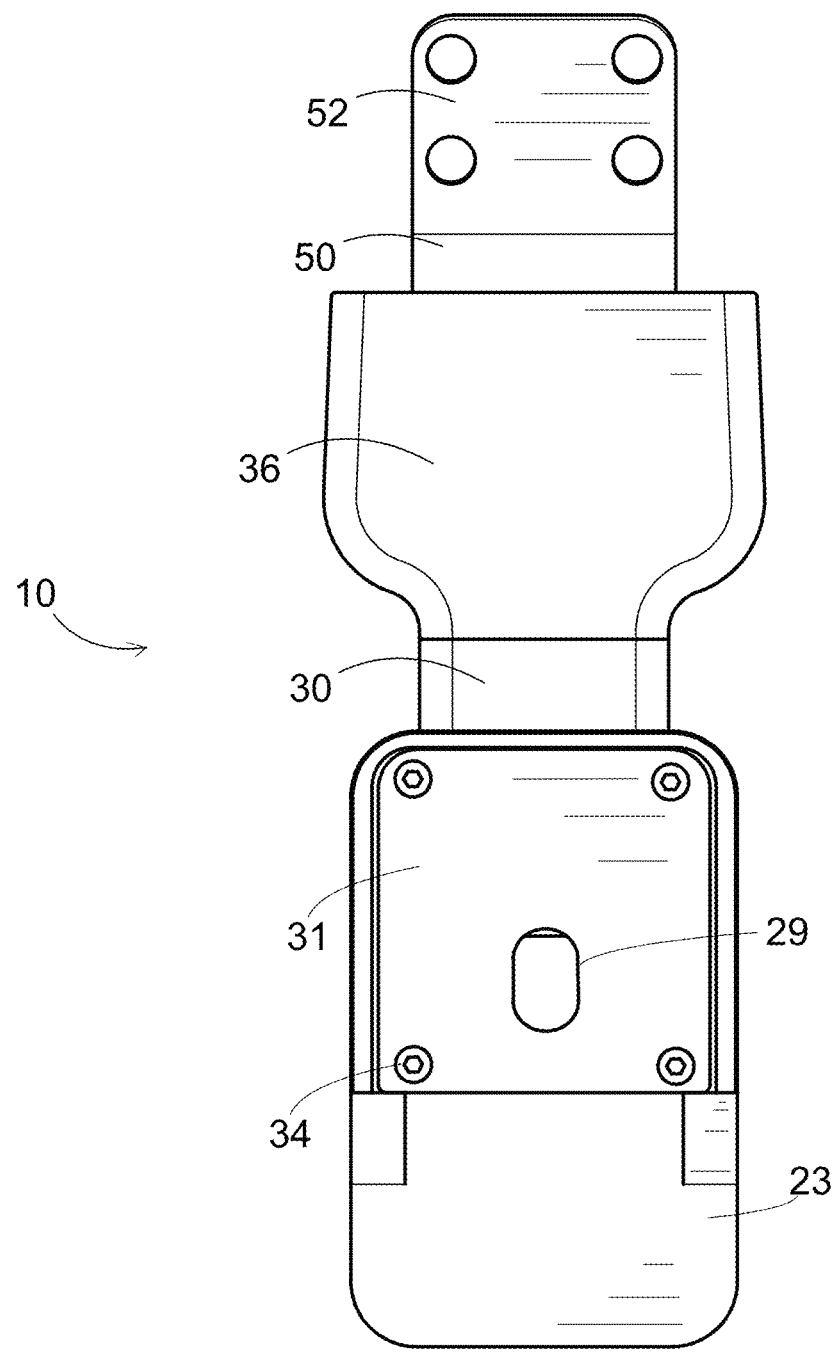
FIG. 12 is a front view of a pivotable bracket with internal cable, according to an embodiment of the invention.
Figure 13:
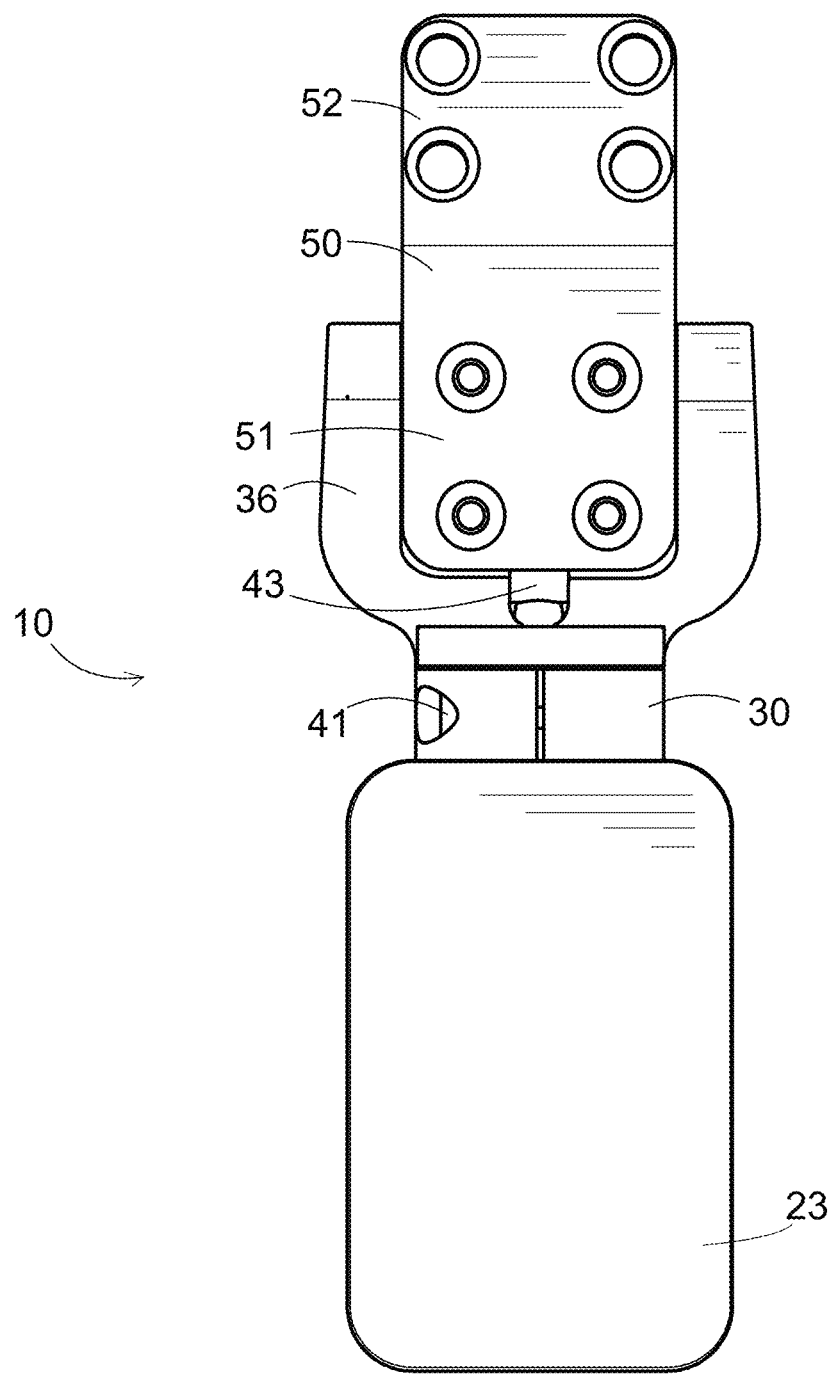
FIG. 13 is a rear view of a pivotable bracket with internal cable, according to an embodiment of the invention.
Figure 14:
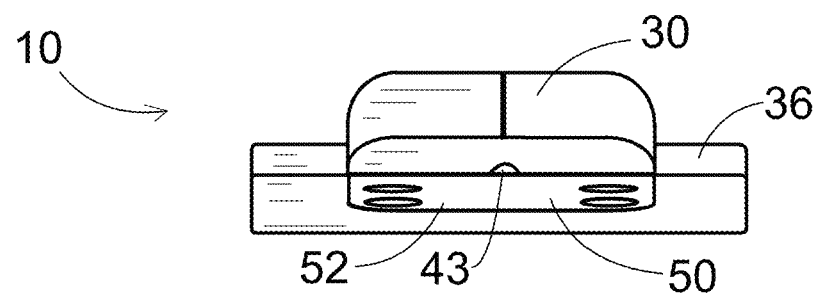
FIG. 14 is a top view of a pivotable bracket with internal cable, according to an embodiment of the invention.
Figure 15:
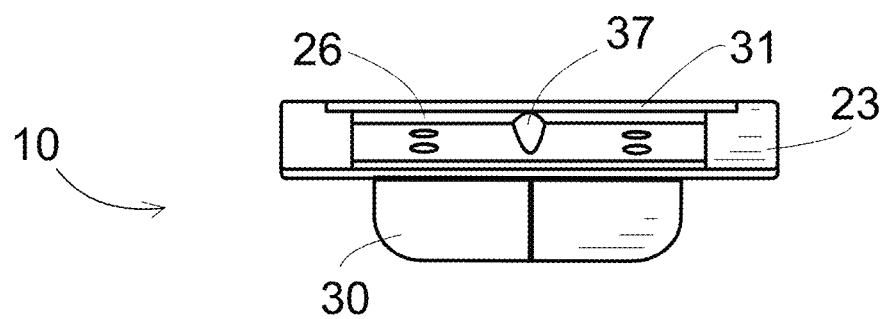
FIG. 15 is a bottom view of a pivotable bracket with internal cable, according to an embodiment of the invention.

The Pivotable Bracket 10 of the present invention is preferably configured to mount on an upper hold-bar 16 of an exercise apparatus 17. A most preferred exercise apparatus for use with the present invention is a personal exercise treadmill, and referred to herein more simply as a "treadmill" 18, as shown in FIGS. 5 through 7. Exercises commonly undertaken by a user on such treadmills include walking, jogging, and running. Most preferably, the upper hold bar of the treadmill includes a bar monitor bracket 19.

The exercise apparatus includes a monitor 20, which has a hold-bar bracket 21 that is initially attached to the monitor bracket on the upper hold bar. For use with the Pivotable Bracket, the hold-bar bracket of the monitor can be detached from the bar monitor bracket of the exercise apparatus by a user and reattached to the Pivotable Bracket, as detailed later herein.

The internal connective cable 11 is selected to match a base cable 15, which connects the monitor 20 to the exercise apparatus 17. The monitor may be conventionally referred to as a "screen". In a most preferred configuration of the bar monitor bracket 19 for use with the Pivotable Bracket 10 of the present invention, the bar monitor bracket extends upward from the upper hold-bar 16 at a forward end 22 of the treadmill, as shown in FIG. 1, and as found in the Tread™ model of exercise apparatus, which is a treadmill manufactured by Peloton Interactive, Inc., of New York, US.

Alternatively, the exercise apparatus 17, which again is most preferably a treadmill 18 may be any conventional treadmill as typically used for personal exercise, but preferably configured to include the bar monitor bracket 19 that extends upward from the upper hold-bar 16 at the forward end 22 of the exercise apparatus. The forward end is the portion of the exercise apparatus that a user faces when standing on, seated upon, or otherwise in an exercising position on the exercise apparatus. Also alternatively, as preferred when the exercise apparatus is the treadmill, the user walks, jogs, or runs on the treadmill while facing the forward end of the treadmill, and can grasp or lean on the upper hold-bar, again as positioned at the forward end of the treadmill.

As shown in FIG. 1, the Pivotable Bracket 10 of the present invention includes a pivot body 23 that is attachable onto the bar monitor bracket 19 on the upper hold-bar 16. The attachment of the pivot body to the monitor bracket is most preferably a bolted body attachment 24, but can be any type of attachment as well known to those skilled in mechanical attachments, including screws, rivets, clips, welds, adhesives, or any combination thereof.

Figure 2:
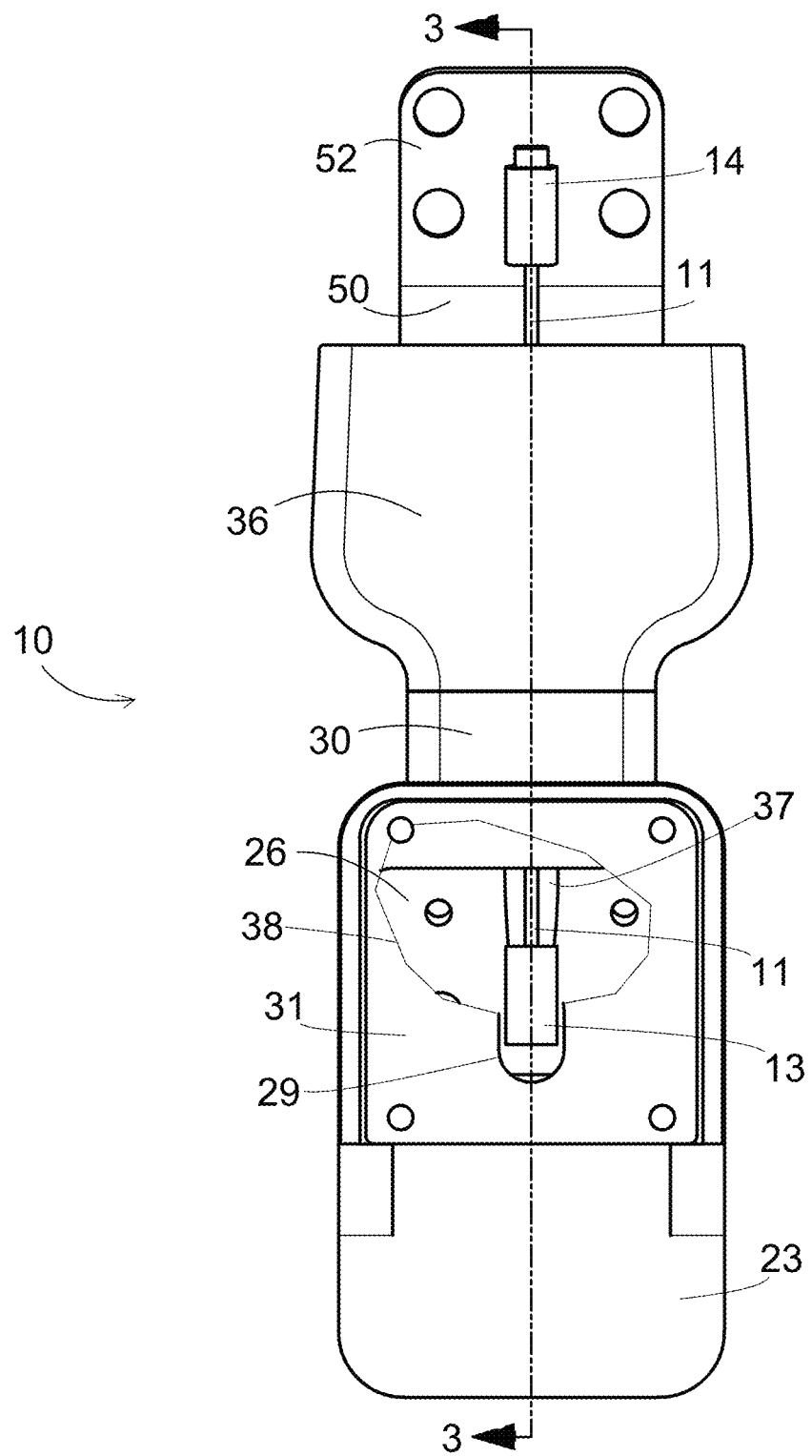
FIG. 2 is a front view of a pivotable bracket with internal cable, with a cover cut-away and according to an embodiment of the invention.

In the bolted body attachment 24, which is the preferred mounting of the pivot body 21 to the monitor bracket 18, a set of four body bracket bolts 25 are most preferred to be used to secure the pivot body to the monitor bracket. For the preferred alternative of the pivotable bracket 10, the pivot body includes a pivot body cavity 26, as shown in FIG. 2.

The base cable 15 of exercise apparatus 17 terminates with a base cable end 27, as the base cable extends from the upper hold-bar 16. The pivot body cavity receives the base cable end for attachment to the lower internal connection end 13 of the internal connective cable 11. The monitor 20 of the exercise apparatus 17 is initially connected to the base cable end of the base cable.

When the hold-bar bracket 21 of the monitor 20 is initially detached from the bar monitor bracket 19 of the exercise apparatus by a user, and reattached to the Pivotable Bracket 10 of the present invention, the base cable end 27 of the base cable 15 is disconnected from the monitor data port 28 and the base cable end is reconnected to the lower internal connection end 13 of the internal connective cable 11. Typically, the base cable is provided with and is a component part of the exercise apparatus 17, to which the Pivotable Bracket 10 is mounted upon, with the base cable end 27 typically located proximate to the upper hold bar 16 at the forward end 22 of the treadmill 18.

As most preferred, the base cable 15 is similar in construction and purpose to the internal connective cable 11, and also broadly defined herein as any line, wire or connector having the purpose of carrying an electrical current, charge, or data signal. Alternatively, the base cable may be a fiber optic data line or data cable. The internal connective cable extends the base cable so that the monitor 20 can re-connect through the Pivotable Bracket to the exercise apparatus 17.

Specifically, the base cable 15 of the exercise apparatus 17 routes from the upper hold bar 16 into the pivot body cavity 26 of the pivot body 23, as shown in FIGS. 1 and 2. As detailed in FIG. 7, a lower data connection 34 is made by connecting the base cable to the lower internal connection end 13 of the internal connective cable 11. As shown in FIG. 1, a pivot cover 31 can be placed or mounted over the pivot body cavity 26 to enclose, shield, and hide the internal connective cable within and includes a cover portal 29, for the as is preferred. The pivot body also includes a body conduit 37 through which the internal connective cable 11 can route upward from the pivot body cavity and out of the pivot body. The body conduit with the internal connective cable is shown in FIG. 2, within a cover cup-away 38 of the pivot cover.

In a most preferred embodiment of the Pivotable Bracket 10, the pivot body 23 is attached to a pivot clamp 30. The pivot clamp mounts to the pivot body, preferably with the use if a pair of clamp mounting screws 32, as shown in FIG. 1. The pivot clamp includes a head socket 33. The head socket receives a head post 35, with the head post being and extended part of a pivot head 36. The head post extends downward from the pivot head and is received into the head socket.

Most preferably, as shown in FIG. 1, the head post 35 is cylindrical in shape, having a post diameter 39. The corresponding head socket 33 is a circular shaped hole having a socket diameter 40, with the head post insert-able and mate-able precisely into the head socket. With the head post received within the head socket, the pivot head is able to swivel within the pivot clamp upon the pivot body. Preferable post diameter and socket diameters are each approximately 2 cm (0.8 in), with the socket diameter slightly larger than the post diameter.

Figure 3:
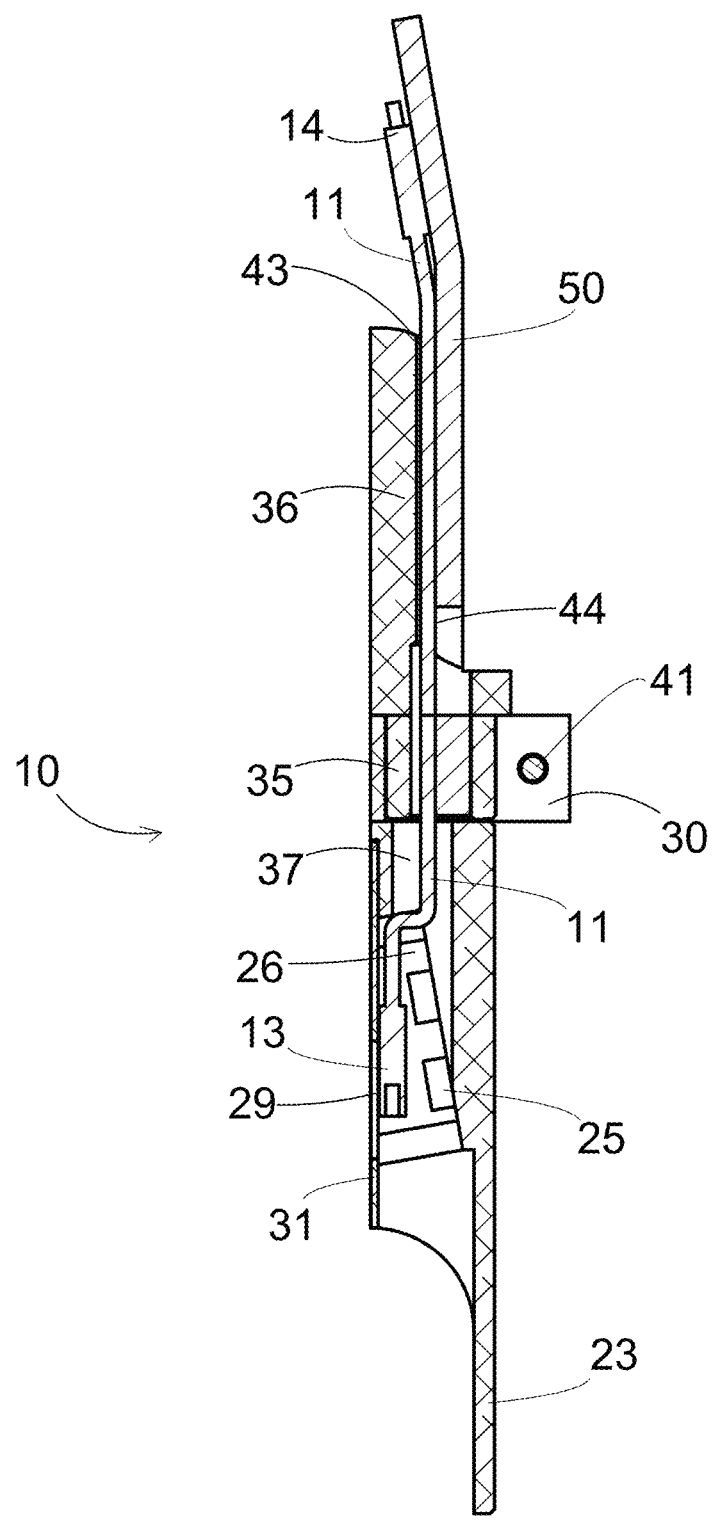
FIG. 3 is a sectioned side view along section line 3-3 of FIG. 2 of a pivotable bracket with internal cable, according to an embodiment of the invention.
Figure 4:
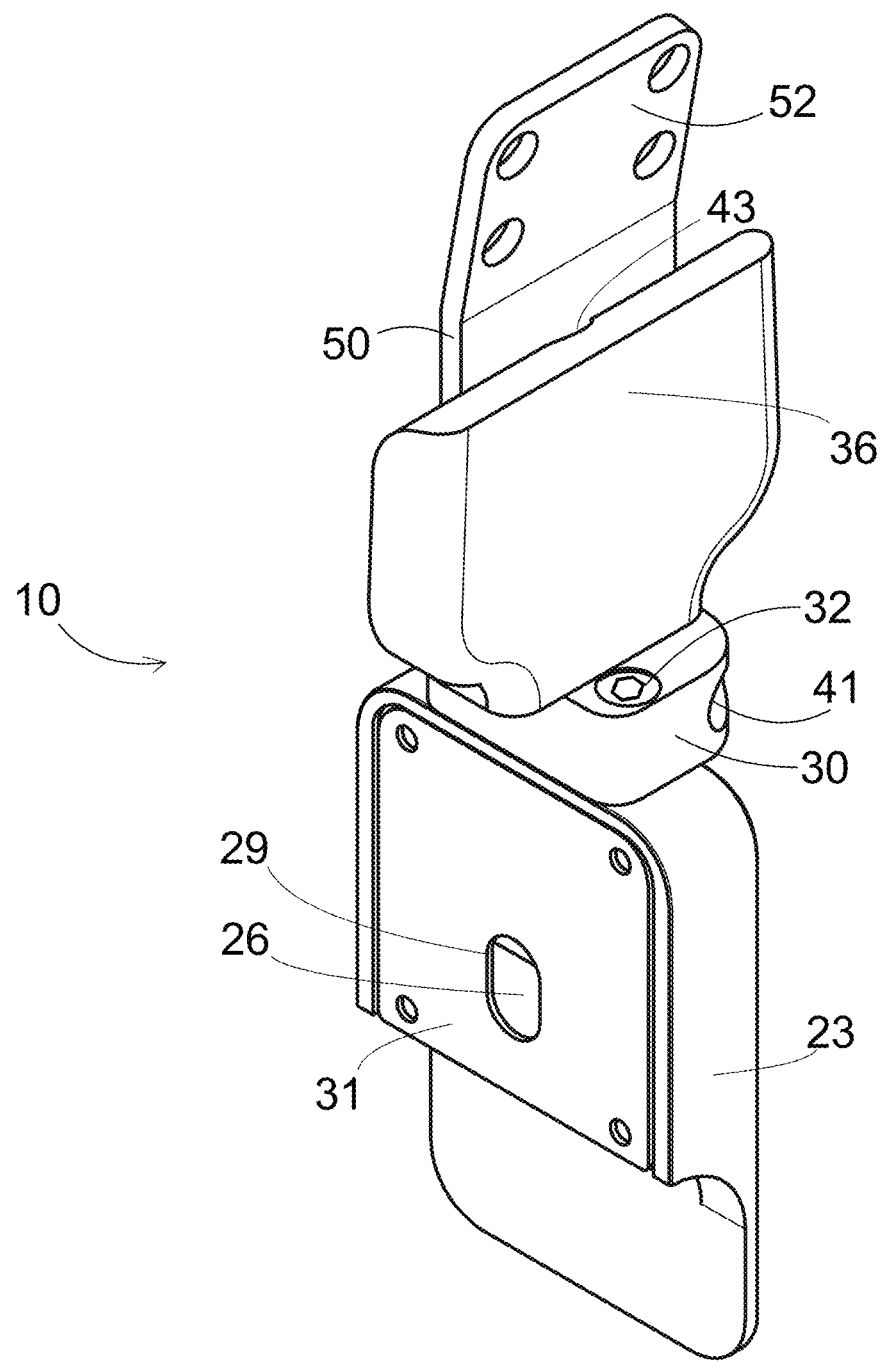
FIG. 4 is an isometric view of the pivotable bracket with internal cable, according to an embodiment of the invention.

Most preferably, the socket diameter 40 of the head socket 33 can be selectively increased or decreased by adjusting the pivot clamp 30. Preferably, the pivot clamp includes a clamp adjustment screw 41, as shown in FIGS. 1, 3 and 4. The clamp adjustment screw passes through the pivot clamp to reduce or increase the size of the socket diameter 40. By tightening the clamp adjustment screw, the head socket of the pivot clamp more firmly engages around the head post of the pivot head. By loosening the clamp adjustment screw, the head socket of the pivot clamp less firmly or more loosely engages around the head post of the pivot head.

A user of the Pivotable Bracket 10 is able to adjust resistance of the rotation or swiveling of the pivot head 36 on the pivot body 23. Additionally, with maximal tightening of the clamp adjustment screw 41, the user can lock the position of the pivot head on the pivot body.

In an alternative embodiment of the Pivotable Bracket 10, the head post 35 could be part of the pivot body 23 instead of part of the pivot head 36, and the head socket 33 and pivot clamp 30 could be part of the pivot head instead of part of the pivot body. In this alternative, the head post would extend upward to be received into the head socket of the pivot clamp, with the pivot clamp mounted to the pivot head instead of the pivot body, as most preferred. The mounting of the pivot clamp to the pivot body also could be accomplished with use of the pair of clamp mounting screws 32, with the pivot clamp including a clamp adjustment screw 41, as most preferred.

The internal connective cable 11 routes or "threads" through the Pivotable Bracket 10. Most preferably the head post 35 of the pivot head 36 includes a head conduit 43, through which the internal connective cable 11 passes through. The pivot head also includes a hollow interior, referred to herein as a head cavity 44. The head conduit opens into the head cavity and the internal connective cable can route from the head conduit into the head cavity, as shown in FIG. 1. The internal connective cable routes from pivot body cavity 26 and then through the body conduit 37 of the pivot body 23, up thorough the head conduit 43 and into the head cavity, then up and out of the pivot head for connection to the monitor data port 28 of the monitor 20.

Most preferably, a head monitor bracket 50 covers the head cavity 44 of the pivot head 36 to enclose the internal connective cable 11 within. The head monitor bracket has a head connection 51 that mounts the monitor bracket to the pivot head, and a monitor connection 52 that mounts the head monitor bracket to the monitor. As shown in FIG. 1, a set of four head bracket bolts 54 that preferably mount the head connection to the pivot head, and a set of four monitor bracket bolts 55 that preferably mount the monitor connection to the monitor.

The exercise apparatus 17 is ready to operate with the addition of the Pivotable Bracket 10, with the internal connective cable 11 extending upward from the pivot head, the upper internal connection end 14 connect to the monitor data port 28 of the monitor. The Pivotable Bracket 10 allows a user of the treadmill 18, to swivel the monitor 20 a full 360 degrees about the upper hold-bar 16 of the treadmill or any other exercise device 17 onto which the Pivotable Bracket is mounted, as shown in FIGS. 5 and 6. The swivel action of the Pivotable Bracket allows use of the monitor for many other activities, such as classes, use the monitor with adjacent exercise equipment, or simply to view the monitor while not standing on the treadmill equipped with the Pivotable Bracket.

Additionally, the user can adjust the resistance or torque required for the rotation of the monitor on the Pivotable Bracket 10. Again, by tightening the clamp adjustment screw 41, the head socket 33 of the pivot clamp 30 engages the head post 35 of the pivot head 36 more firmly. A user of the Pivotable Bracket is able to adjust resistance of the rotation or swiveling of the pivot head on the pivot body 23. With further tightening of the clamp adjustment screw, the user can lock the position of the pivot head on the pivot body, thereby locking the monitor in any desired position. Alternatively, the user can make the monitor stiffer to turn by tightening the clamp adjustment screw, or easier to turn by loosening the clamp adjustment screw, depending on preference.

When the Pivotable Bracket 10 of the present invention is installed with the Peloton Tread™ model of exercise apparatus, which again is a treadmill manufactured by Peloton Interactive, Inc., of New York, US, the monitor 20 will be raised approximately five inches, which allows for a better viewing angle to the user while on the treadmill 18. Then, when off the treadmill the user can easily rotate the monitor or display to any angle of horizontal rotation and also angle the monitor up or down depending on desired viewing angle of user. When finished the display can easily be rotated back to the original position without requiring tools.

A most preferred embodiment of the Pivotable Bracket 10 has size of approximately 10 inches (25.4 cm) in total height by ×3.5 inches wide (8.9 cm) and 1 inch (2.54 cm) in depth, with a total weight of approximately 1.5 pounds (0.68 kg) fully assembled when made of the preferred material, which is specifically a 6061-T6 tempered aluminum alloy as is most preferred. Aluminum alloy 6061 is a medium to high strength heat-treatable alloy with very good corrosion resistance and very good weld-ability. Typically, the T6 tempered 6061 has an ultimate tensile strength of at least 42,000 psi (290 MPa) and yield strength of at least 35,000 psi (241 MPa), in thicknesses of 0.250 inch (6.35 mm) or less.

Additionally, most preferably a type III anodized finish is given to the Pivotable Bracket, also known as a "hardcoat finish". This finish is exceptionally hard and durable, qualities which allow the Pivotable Bracket to resist damage due to corrosion and abrasion.

For this Detailed Description, the terms "connected", "attached", "coupled" and "mounted" refer to any form of interaction between two or more elements, including mechanical, electrical, magnetic, electromagnetic, fluid, and thermal interaction. Two components may be functionally coupled with or to each other, even though they are not in direct contact with each other.

Also, the terms "approximately" or "approximate" are employed herein throughout, including this detailed description and the attached claims, with the understanding that is denotes a level of exactitude commensurate with the skill and precision typical for the particular field of endeavor, as applicable.

Additionally, the term "proximate to" is employed herein throughout, including this detailed description and the attached claims, with the understanding that is denotes immediately before or after in order, or located next to or adjacent in place; close to; or very near.

Also additionally, the terminology used in this application is to be interpreted according to ordinary and customary usage in the field of the invention as exemplified in the pertinent U.S. and International Patent Classification Codes, and equivalent codes in other patent classification systems.

The word "embodiment" is used herein to mean "serving as an example, instance, or illustration." Any embodiment described herein is not necessarily to be construed as preferred or advantageous over other embodiments. While the various aspects of the embodiments are presented in drawings, the drawings are not necessarily drawn to scale.

Additionally, reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above Detailed Description, various features are sometimes grouped together in a single embodiment, figure, or description thereof for the purpose of streamlining this disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description together with the accompanying drawings referred to herein as the disclosure, with each claim standing on its own as a separate embodiment. This disclosure includes all permutations of the independent claims with their dependent claims.

In compliance with the statutes, the invention has been described in language more or less specific as to structural features and process steps where applicable. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described.

Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A pivotable bracket for an exercise apparatus with a monitor, the pivotable bracket comprising:
    a pivot body, the pivot body attachable to a bar monitor bracket of said exercise apparatus, and the pivot body having a pivot body cavity;
    a pivot clamp on the pivot body, and the pivot clamp including a head socket;
    a pivot head having a head cavity within the pivot head and the pivot head including a head post on the pivot head, the head post extending from the pivot head, the head post having a head conduit, the head post received into the head socket of the pivot clamp, and the head post of the pivot head able to swivel within the pivot clamp;
    a head monitor bracket attached to the pivot head, and the head monitor bracket attachable to said monitor; and
    an internal connective cable that threads through the pivotable bracket, with the internal connective cable routed from the head cavity of the pivot head, through the head conduit of the head post, and into the pivot body cavity of the pivot body.

2. The pivotable bracket for an exercise apparatus with a monitor of claim 1, additionally wherein:
    the head socket of the pivot clamp has a socket diameter and the head post of the pivot head has a post diameter; and
    the pivot clamp includes a clamp adjustment screw, with the clamp adjustment screw passing through the pivot clamp, with a tightening of the clamp adjustment screw to reduce the size of the socket diameter to more firmly engage the head post of the pivot head, and with a loosening of the clamp adjustment screw to increase the size of the socket diameter to less firmly engage the head post of the pivot head.

3. The pivotable bracket for an exercise apparatus with a monitor of claim 1, additionally wherein:
    the internal connective cable has a lower internal connection and an upper internal connection, the lower internal connection located within the pivot body cavity and located proximate to the bar monitor bracket of said exercise apparatus and the upper internal connection is located proximate to the head monitor bracket of the pivot head;
    a base cable end that terminates a base cable of said exercise apparatus is receivable into the pivot body cavity of the pivot head, and the lower internal connection end of the internal connective cable is attachable to the base cable end within the pivot body cavity; and
    said monitor attachable to the head monitor bracket includes a monitor connection, and the monitor connection is connectable to the upper internal connection of the internal connective cable.

4. A pivotable bracket for an exercise apparatus with a monitor, the pivotable bracket comprising:
    a pivot body, the pivot body attachable to a bar monitor bracket of the exercise apparatus, the pivot body having a pivot body cavity and a head post, the head post extending from the pivot body, the head post having a head conduit;
    a pivot head including a head cavity within the pivot head and a pivot clamp on the pivot head, and the pivot clamp including a head socket;
    the head post of the pivot body received into the head socket of the pivot clamp, and the pivot clamp of the pivot head able to swivel on the head post of the pivot body;
    a head monitor bracket attached to the pivot head, and the head monitor bracket attachable to said monitor; and
    an internal connective cable that threads through the pivotable bracket, with the internal connective cable routed from the head cavity of the pivot head, through the head conduit of the head post, and into the pivot body cavity of the pivot body.

5. The pivotable bracket for an exercise apparatus with a monitor of claim 4, additionally wherein:
    the head socket of the pivot clamp has a socket diameter and the head post of the pivot head has a post diameter; and
    the pivot clamp includes a clamp adjustment screw, with the clamp adjustment screw crossing through the pivot clamp, with a tightening of the clamp adjustment screw to reduce the size of the socket diameter to more firmly engage the head post of the pivot head, and with a loosening of the clamp adjustment screw to increase the size of the socket diameter to less firmly engage the head post of the pivot head.

6. The pivotable bracket for an exercise apparatus with a monitor of claim 4, additionally wherein:
    the internal connective cable has a lower internal connection and an upper internal connection,
    the lower internal connection located within the pivot body cavity and proximate to the bar monitor bracket of the exercise apparatus and the upper internal connection is located proximate to the head monitor bracket of the pivot head;
    a base cable end that terminates a base cable of said exercise apparatus is receivable into the pivot body cavity of the pivot head, and the lower internal connection end of the internal connective cable is attachable to the base cable end within the pivot body cavity; and
    the monitor attachable to the head monitor bracket includes a monitor connection-, and the monitor connection of said monitor is connectable to the upper internal connection of the internal connective cable.

7. A pivotable bracket for an exercise apparatus with a monitor, the pivotable bracket comprising:
    a pivot body, the pivot body attachable to a bar monitor bracket of the exercise apparatus, and the pivot body having a pivot body cavity;
    a pivot head having a head cavity within the pivot head and the pivot head including a head post on the pivot head, the head post extending from the pivot head, the head post having a head conduit, and the pivot head able to swivel on the pivot body;
    a head monitor bracket attached to the pivot head, and the head monitor bracket attachable to said monitor;

an internal connective cable that threads through the pivotable bracket, with the internal connective cable routed from the head cavity of the pivot head, and into the pivot body cavity of the pivot body;

the internal connective cable has a lower internal connection and an upper internal connection, the lower internal connection located within the pivot body cavity and proximate to the bar monitor bracket of the exercise apparatus and the upper internal connection is located proximate to the head monitor bracket of the pivot head;

the exercise apparatus includes a base cable that terminates with a base cable end and the base cable extends from bar monitor bracket and the pivot body cavity of the pivot head receives the base cable end for attachment to the lower internal connection end of the internal connective cable; and said monitor attachable to the head monitor bracket includes a monitor connection, and the monitor connection of said monitor is connectable to the upper internal connection of the internal connective cable.

* * * * *